(No Model.)

W. B. ROACH.
Cotton Hoe.

No. 240,767.　　　　　Patented April 26, 1881.

Witnventor
A. H. Krause.
F. G. Dieterich.

Inventor
William B Roach
by Louis Bagger & Co.
Attorneys

N. PETERS, PHOTO-LITHOGRAPHER, WASHINGTON, D. C.

UNITED STATES PATENT OFFICE.

WILLIAM B. ROACH, OF CLIFTON, TENNESSEE.

COTTON-HOE.

SPECIFICATION forming part of Letters Patent No. 240,767, dated April 26, 1881.

Application filed February 7, 1881. (No model.)

*To all whom it may concern:*

Be it known that I, WILLIAM B. ROACH, of Clifton, in the county of Wayne and State of Tennessee, have invented certain new and useful Improvements in Cotton-Hoes; and I do hereby declare that the following is a full, clear, and exact description of the invention, which will enable others skilled in the art to which it appertains to make and use the same, reference being had to the accompanying drawings, which form a part of this specification, and in which—

Figure 1:
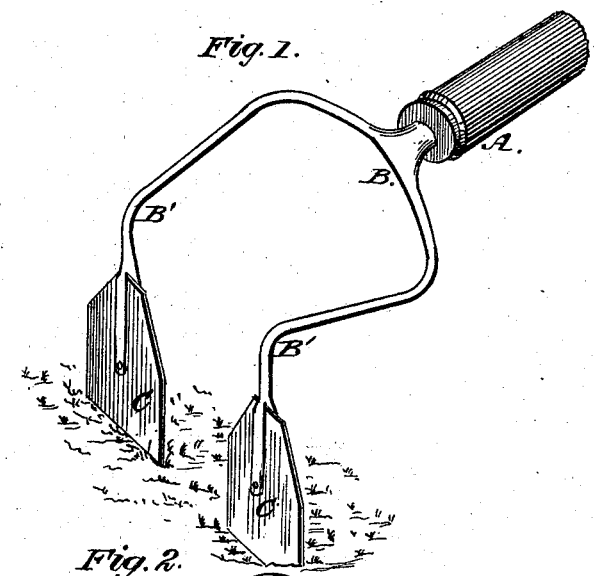
Figure 2:
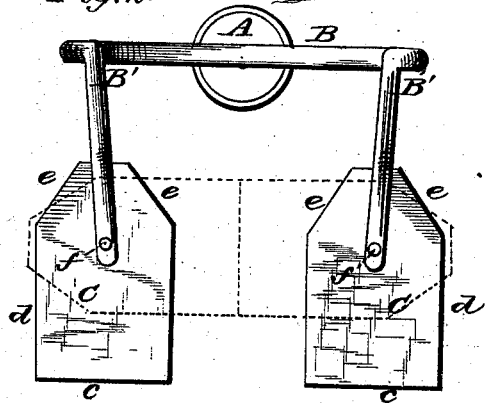
Figure 3:
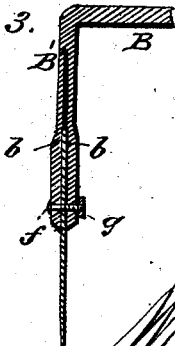

Figure 1 is a perspective view of my improved hoe. Fig. 2 is a front or face view of the blades; and Fig. 3 is a section through one of the arms or shanks holding the adjustable blades.

Similar letters of reference indicate corresponding parts in all the figures.

My invention has relation to hand-hoes adapted more especially to the hoeing of cotton-plants; and it consists in the improvement hereinafter set forth, and particularly pointed out in the claim.

In the accompanying drawings, A is a wooden stock or handle, of suitable length, into which is inserted a bifurcated rod, B, the arms of which are bent, as shown in the drawings, with their outer ends parallel to each other, and bent at right angles, as shown at B' B'. The lower bent parts, B', are split, as shown at *b*, Fig. 3, for the insertion of the adjustable blades C, each of which is of the configuration clearly shown in Figs. 1 and 2 of the drawings—that is, made with a straight bottom edge, *c*, and straight sides *d d*, the upper part of which are, however, cut off obliquely, as shown at *e e*. Each blade is held in place within its split arm B' by a bolt, *f*, and tightening-nut *g*. By loosening this nut the blade may be adjusted at any desired angle, as shown in dotted lines on the drawings, and is held rigidly in place in its adjusted position by again tightening down nut *g*.

By this arrangement the pair of hoe-blades C C may be adjusted to fit the size of plants and the character of the hill or ridge, and may be adjusted to adapt it to the hoeing of sorghum, peanuts, &c. For hard or strong soil the blades may be entirely reversed, with their upper narrow ends down, and for hoeing and gathering potatoes they should be adjusted sidewise, with their straight bottom edges meeting, so as to constitute a single broad blade, the length of each hoe-blade, from its pivot to its bottom, being exactly one-half the distance between the two arms B' B'.

Having thus described my invention, I claim and desire to secure by Letters Patent of the United States—

The described hoe, having arms B B' B B', split at their lower ends at *b b*, adjustable blades C C, cut off at their upper corners, *e e*, bolts *f*, and tightening-nuts *g*, substantially as and for the purpose herein shown and specified.

In testimony that I claim the foregoing as my own I have hereto affixed my signature in presence of two witnesses.

WILLIAM BENJAMIN ROACH.

Witnesses:
   Jo. G. BERNY,
   JAS. A. LANCASTER.